(12) United States Patent
Kline et al.

(10) Patent No.: US 12,041,895 B2
(45) Date of Patent: Jul. 23, 2024

(54) HANGING BASKET DEVICE AND METHOD

(71) Applicant: WHEN TO WATER LLC, Stow, OH (US)

(72) Inventors: Carter Raymond Kline, Stow, OH (US); Michael Lee Turner, Akron, OH (US)

(73) Assignee: WHEN TO WATER LLC, Stow, OH (US)

( * ) Notice: Subject to any disclaimer, the term of this patent is extended or adjusted under 35 U.S.C. 154(b) by 120 days.

(21) Appl. No.: 17/874,969

(22) Filed: Jul. 27, 2022

(65) Prior Publication Data

US 2023/0034872 A1   Feb. 2, 2023

Related U.S. Application Data

(60) Provisional application No. 63/228,163, filed on Aug. 2, 2021.

(51) Int. Cl.
*A01G 9/02* (2018.01)
*G01G 23/20* (2006.01)

(52) U.S. Cl.
CPC .................... *A01G 9/024* (2013.01)

(58) Field of Classification Search
CPC .... A01G 9/024; A01G 27/008; A01G 27/003; G01G 23/20; G01G 3/00
See application file for complete search history.

(56) References Cited

U.S. PATENT DOCUMENTS

| | | | | |
|---|---|---|---|---|
| 4,078,625 | A | * | 3/1978 | Loeb .................... A01G 27/003 177/233 |
| 4,216,619 | A | * | 8/1980 | Espy .................... A01G 27/003 211/1.51 |
| 4,454,831 | A | * | 6/1984 | Gallo .................... G01G 19/40 177/233 |
| 4,480,465 | A | * | 11/1984 | Chase .................... G01N 19/10 116/DIG. 32 |
| 5,315,784 | A | * | 5/1994 | Henehan ................ A47G 7/047 47/67 |
| 6,564,509 | B1 | * | 5/2003 | Zahner ................. A01G 27/008 177/233 |
| 7,129,426 | B1 | * | 10/2006 | Wang ....................... G01G 3/02 177/186 |
| 8,973,518 | B2 | | 3/2015 | Anga |
| 9,338,951 | B2 | | 5/2016 | Anga |
| 2014/0069526 | A1 | * | 3/2014 | Anga .................... A01G 25/16 116/200 |
| 2014/0076422 | A1 | * | 3/2014 | Anga ................... A01G 27/003 137/406 |

* cited by examiner

*Primary Examiner* — Kristen C Hayes
(74) *Attorney, Agent, or Firm* — Rankin, Hill & Clark LLP (57) ABSTRACT

A hanging basket device includes a first housing configured to be connected to an associated hanging basket and a second housing at least partially slidably received in the first housing. The hanging basket device also includes a user-adjustable indicia that is disposed on the second housing to indicate a relative positional relationship between the first housing and the second housing.

20 Claims, 8 Drawing Sheets

HANGING BASKET DEVICE AND METHOD

BACKGROUND

A hanging basket is a suspended container used for growing plants. These plants could include decorative plants, such as flowers or other types of plants, such as grain, fruit, and vegetables. Typically, hanging baskets are hung from buildings or from dedicated posts. Hanging baskets can be utilized for space-saving reasons and/or to provide aesthetic improvements to an environment.

While hanging baskets provide many advantages as compared to the traditional arrangement of growing the plant in the ground, there are numerous challenges associated with such an arrangement that can have a negative impact on the vitality of the plant in the hanging basket. For example, because of the increased elevation of the hanging basket, there can be a tendency for the proper water management to not occur. Notably, the plant in the hanging basket could be under or over watered, depending on the habits of the individual in charge of maintaining the hanging basket, as the individual may not have a clear view of the soil inside of the hanging basket.

To counteract this issue, the individual may resort to utilizing their fingers to touch the soil to determine the amount of current hydration for the plant. As will be appreciated, this is a dirty task and is thus sometimes avoided. Accordingly, a better device and method is required.

SUMMARY

According to one aspect, a hanging basket device includes a first housing configured to be connected to an associated hanging basket and a second housing at least partially slidably received in the first housing. The hanging basket device also includes a user-adjustable indicia that is disposed on the second housing to indicate a relative positional relationship between the first housing and the second housing.

According to an aspect, a method of maintaining a hanging basket includes providing a hanging basket device that includes a first housing, a second housing at least partially slidably received in the first housing, and user-adjustable indicia. The method also includes connecting the first housing to the hanging basket and adjusting the user-adjustable indicia to a position on the second housing to reflect a current position of the first housing with respect to the second housing.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or feature's relationship to another element(s) and/or feature(s) as, for example, illustrated in the figures.

It will be understood that the spatially relative terms are intended to encompass different orientations of the exemplary container in use in addition to the orientation depicted in the figures. Further, any term of degree used herein, such as "substantially", means a reasonable amount of deviation of the modified word is contemplated such that the end result is not significantly changed.

Referring now to the drawings, wherein like numerals refer to like parts throughout the several views, FIGS. 1-9 illustrate a hanging basket device 10 connected to a hanging basket 12. The hanging basket device 10 can include a first housing 14, a second housing 16, a user-adjustable indicia 18, and a spring 22.

The first housing 14 is configured to be selectively connected to an associated hanging basket 12. The first housing 14 and the second housing 16 cooperate to define a sliding axis along which the first housing 14 slides with respect to the second housing 16. The first housing 14 defines a first housing inner diameter and can include a plurality of arms 26 configured for attachment to the associated hanging basket 12 and a primary element 28. The arms 26 can be somewhat flexible so as to allow for easy connection to the hanging basket 12.

Further, the arms 26 can include a variety of attachment elements 32 for attaching the hanging basket 12 with the hanging basket device 10 without departing from the scope of this disclosure. The primary element 28 can have a cylindrical shape that is somewhat hollow. However, other shapes are possible and contemplated. The primary element 28 can include an upper end 34 that defines an entry point for the second housing 16 into the first housing 14 and a lower end 36 that is adjacent the plurality of arms 26.

The upper end 34 can define an upper aperture 38 that is an entry point for the second housing 16 into the first housing 14 and the lower end 36 can define a lower aperture 42 that receives the plurality of arms 26. The first housing 14 defines a first chamber 44 that extends from the lower aperture 42 to the upper aperture 38 along the sliding axis.

The first housing 14 can also include a stop member 46 disposed within the first chamber 44 that limits movement of the second housing 16 beyond a predetermined point. The lower aperture 42 provides unimpeded entry into and exit from the first chamber 44 but for the plurality of arms 26 and the stop member 46. Because of this openness provided by the lower aperture 42, any water or other material that enters into the hanging basket device 10 can be easily removed. The stop member 46 can define a first bore 48 as will be described hereinafter.

The second housing 16 is at least partially slidably received in the first housing 14 and defines a second housing outer diameter. The first housing 14 and the second housing 16 can be made of similar or dissimilar materials. For example, it is envisioned that the first housing 14 and the second housing 16 could be made of a variety of polymer materials and constructed by a variety of methods, such as extrusion, injection molding, and/or additive manufacturing.

Notably, the first housing 14 and the second housing 16 cooperate to define the sliding axis along which the first housing 14 slides with respect to the second housing 16. As noted hereinbefore, the stop member 46 limits movement of the second housing 16 beyond a predetermined point. Further, the stop member 46 can extend between opposing surfaces of the second housing 16 so as to pass through the sliding axis. By extending between the opposing surfaces of the second housing 16, the first housing 14 is positively stopped and overtravel of the first housing 14 is prevented. This extension between opposing surfaces also provides increased strength for attachment of the stop member 46 to the first housing 14 ensuring that the second housing 16 does not pass thereby.

The second housing 16 can include a hook 52 and a main body 54 disposed at opposite ends thereof. The hook 52 can include a shoulder 56 disposed on the outer diameter of the main body 54 of the second housing 16. The hook 52 can have a traditional shape and be used to attach the hanging basket device 10 to a stationary element, such as a building or post. The shoulder 56 provides a convenient structure to prevent the user-adjustable indicia 18 from being easily removed from the hanging basket device 10, and hence potentially misplaced. The hook 52 can also include a second bore 58 for receipt of the spring 22 as will be described in more detail hereinafter.

The main body 54 can have a cylindrical shape and be somewhat hollow. However, other shapes are possible and contemplated. The main body 54 can include a distal end 54a adjacent and attached to the hook 52 and a proximal end 54b that can be completely received in the first housing 14. The proximal end 54b and the distal end 54a are disposed at opposite ends of the main body 54. The distal end 54a defines a distal aperture 62 that receives the hook 52 and the proximal end 54b defines a proximal aperture 64.

The second housing 16 can define a second chamber 66 that extends from the distal aperture 62 to the proximal aperture 64 along the sliding axis. Further, the distal aperture 62 can provide unimpeded entry into and exit from the second chamber 66 but for the hook 52, thereby minimizing the weight of the hanging basket device 10.

The spring 22 can be made of a variety of materials and be of various types of construction. For example, the spring 22 could be made of metal and be of a helical extension type. The spring 22 can elastically join the first housing 14 and the second housing 16 together. The spring 22 can include a first loop 22a connected to the first housing 14 that defines a first terminus of the spring 22 and a second loop 22b connected to the second housing 16 that defines a second terminus of the spring 22. The first loop 22a is attached to the first bore 48 of the stop member 46 and the second loop 22b is attached to the second bore 58 of the hook 52.

As shown in FIGS. 1-3 and 9, this arrangement ensures that no part of the spring 22 extends outside of the first chamber 44 or the second chamber 66, thereby preventing any snag points or possible points of injury for the user. The spring 22 can also include a plurality of coils 22c disposed between the first loop 22a and the second loop 22b.

The user-adjustable indicia 18 can be made of a variety of materials and shapes without departing from the scope of this disclosure. For example, the user-adjustable indicia 18 could be made of rubber or other polymers and be torus shaped. The user-adjustable indicia 18 can be disposed on the second housing 16 to indicate a relative positional relationship between the first housing 14 and the second housing 16 and is movable on the second housing 16 along the sliding axis.

Further, the user-adjustable indicia 18 can define an indicia outer diameter and an indicia inner diameter. However, the indicia inner diameter is greater than the second housing outer diameter so as to allow the user-adjustable indicia 18 to be moved on the second housing 16 with respect to the first housing 14 and the indicia outer diameter is greater than the first housing inner diameter.

Figure 2:
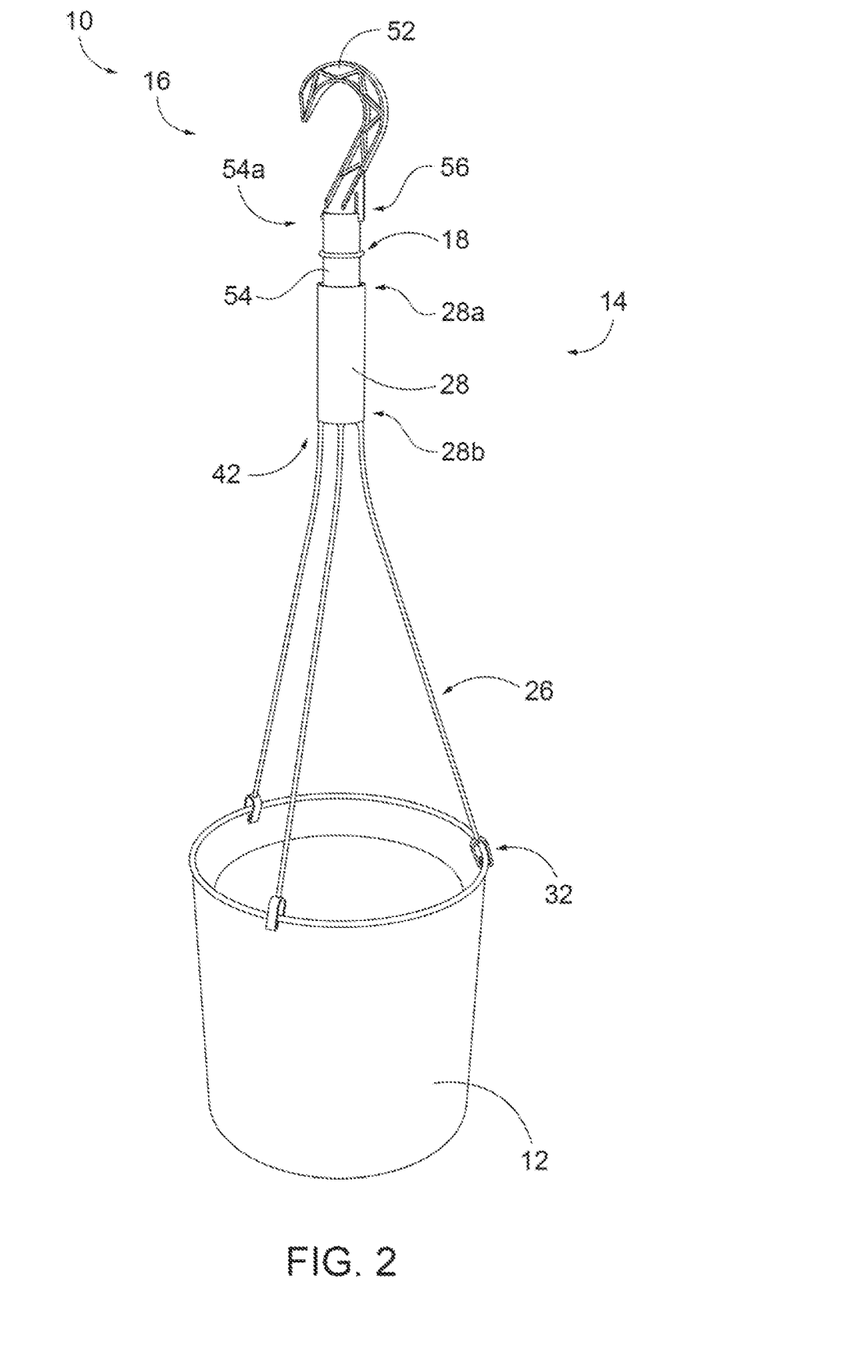
FIG. 2 is a perspective view of the hanging basket device of FIG. 1 with an associated hanging basket attached thereto in a watered state.
Figure 3:
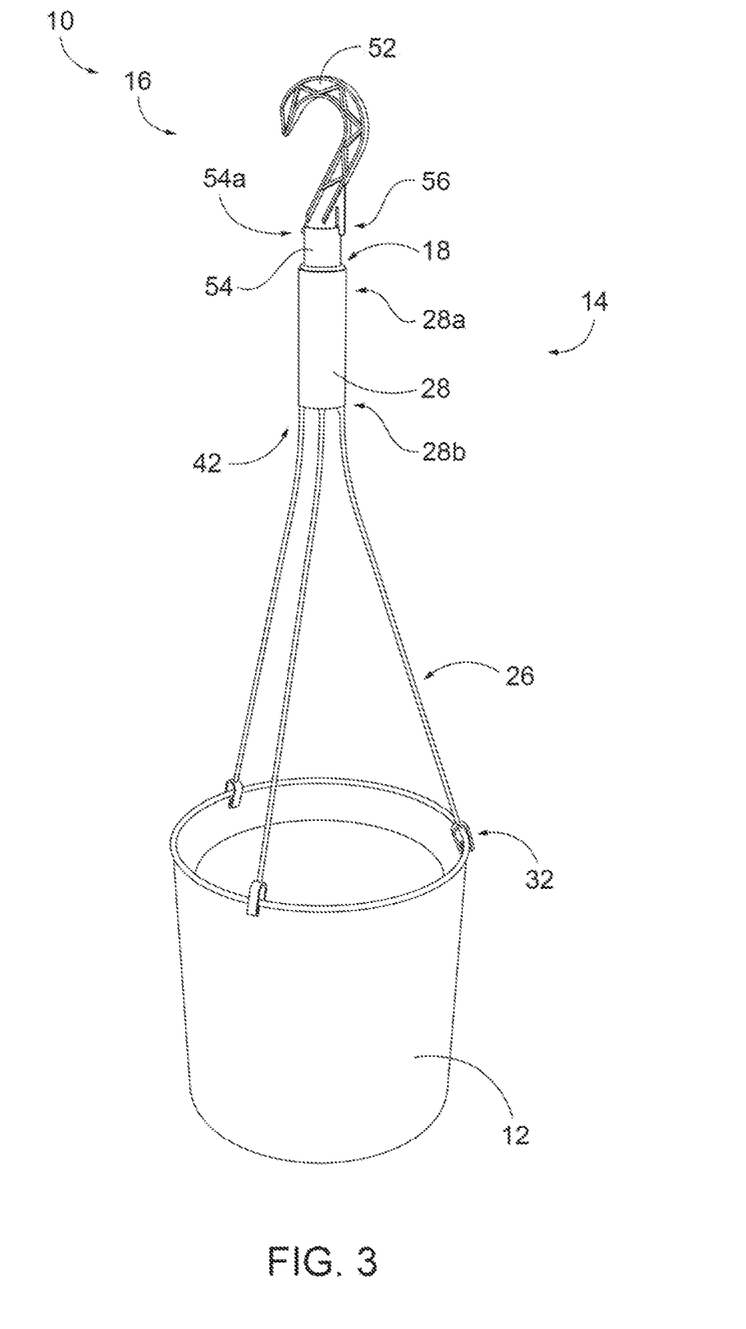
FIG. 3 is a perspective view of the hanging basket device of FIG. 1 with the associated hanging basket attached thereto in an unwatered state.
Figure 4:
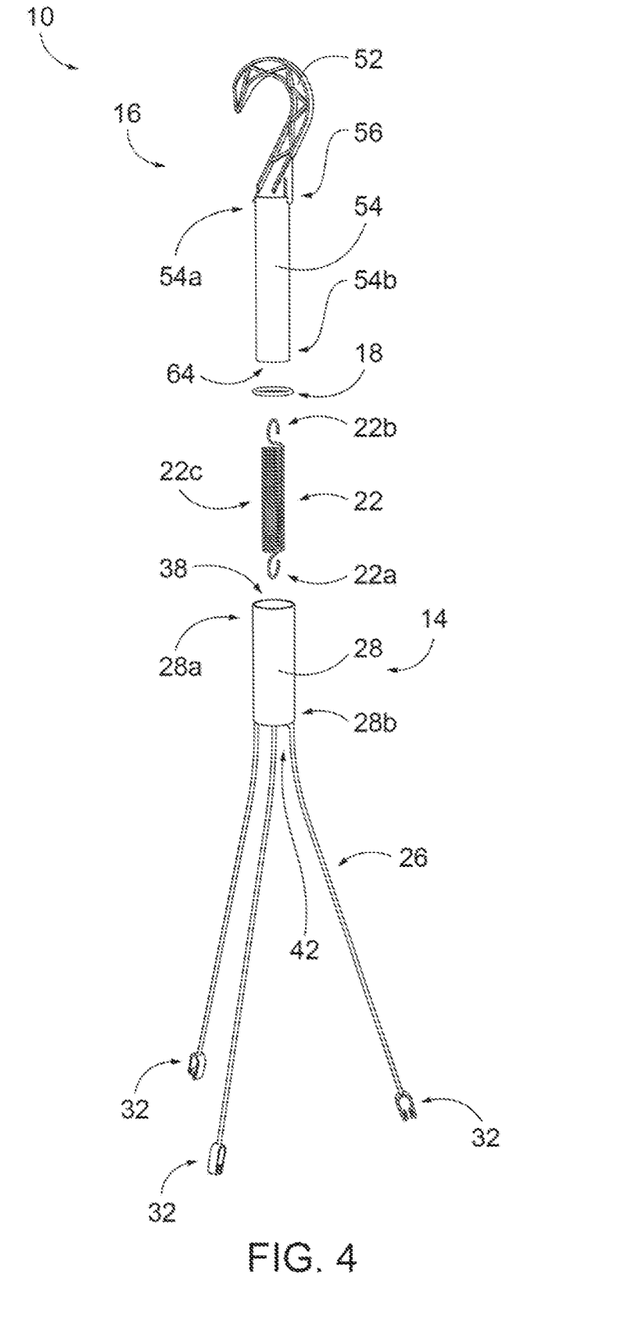
FIG. 4 is an exploded perspective view of the hanging basket device of FIG. 1.
Figure 5:
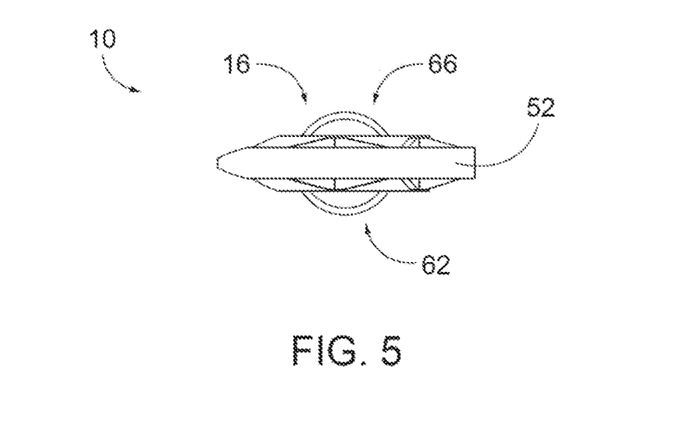
FIG. 5 is a top plan view of the hanging basket device of FIG. 1.
Figure 6:
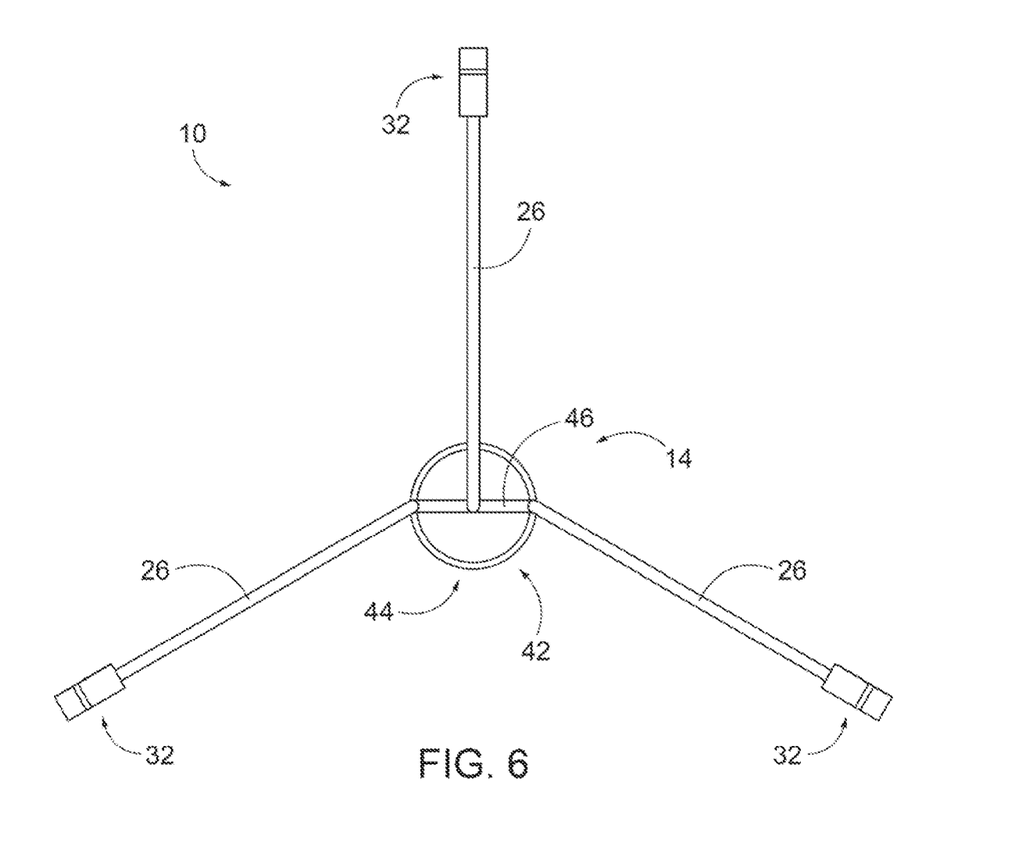
FIG. 6 is a bottom plan view of the hanging basket device of FIG. 1.
Figure 7:
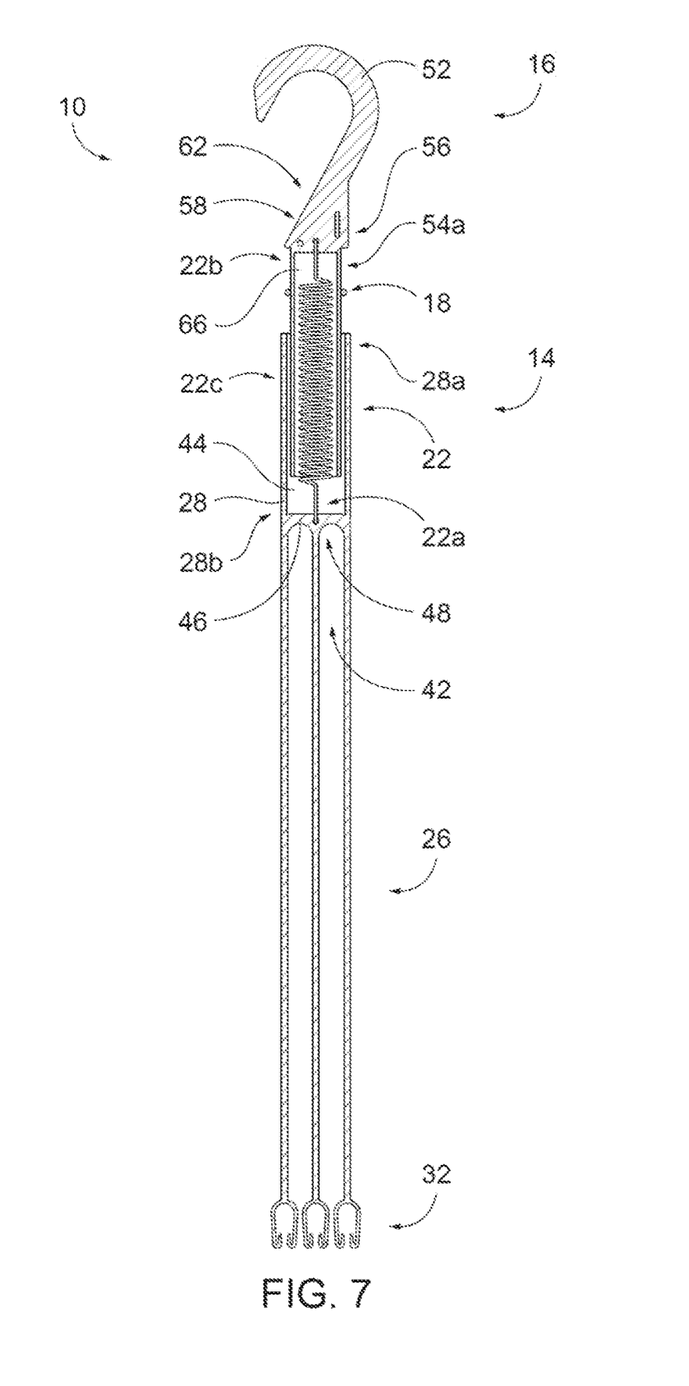
FIG. 7 is a partial sectional front elevation view of the hanging basket device of FIG. 2.
Figure 8:
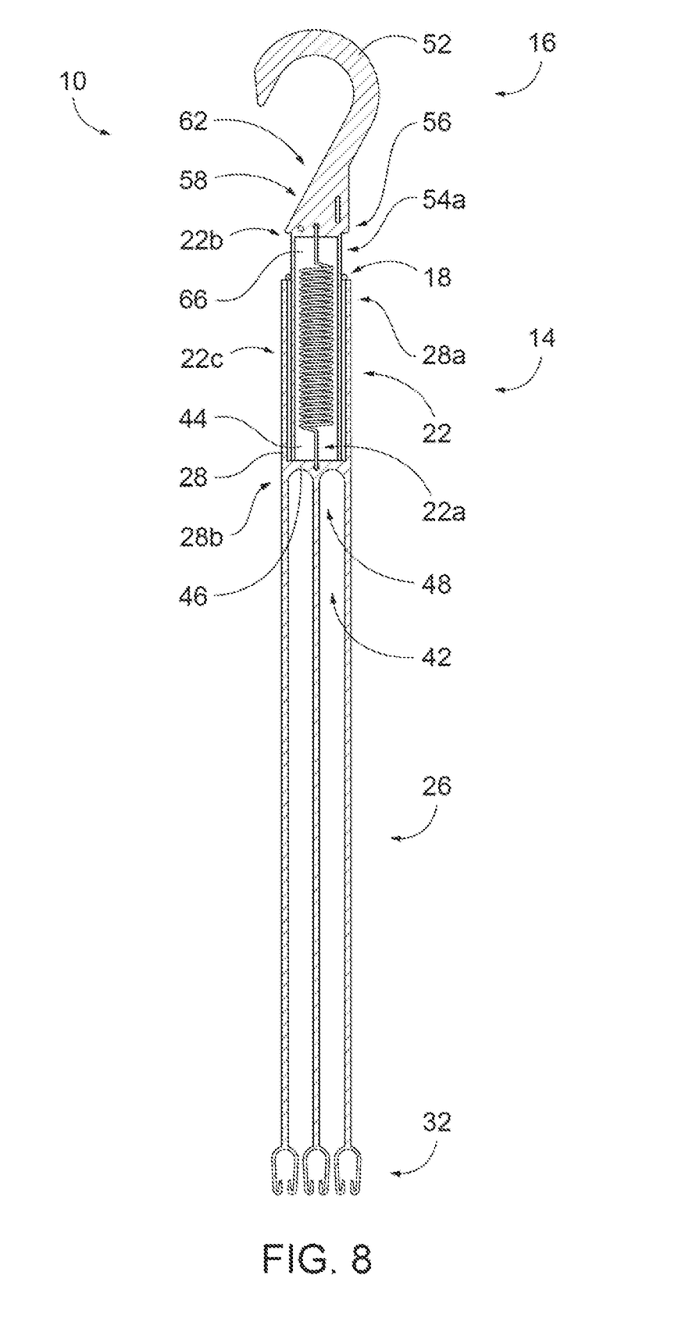
FIG. 8 is a partial sectional front elevation view of the hanging basket device of FIG. 3.
Figure 9:
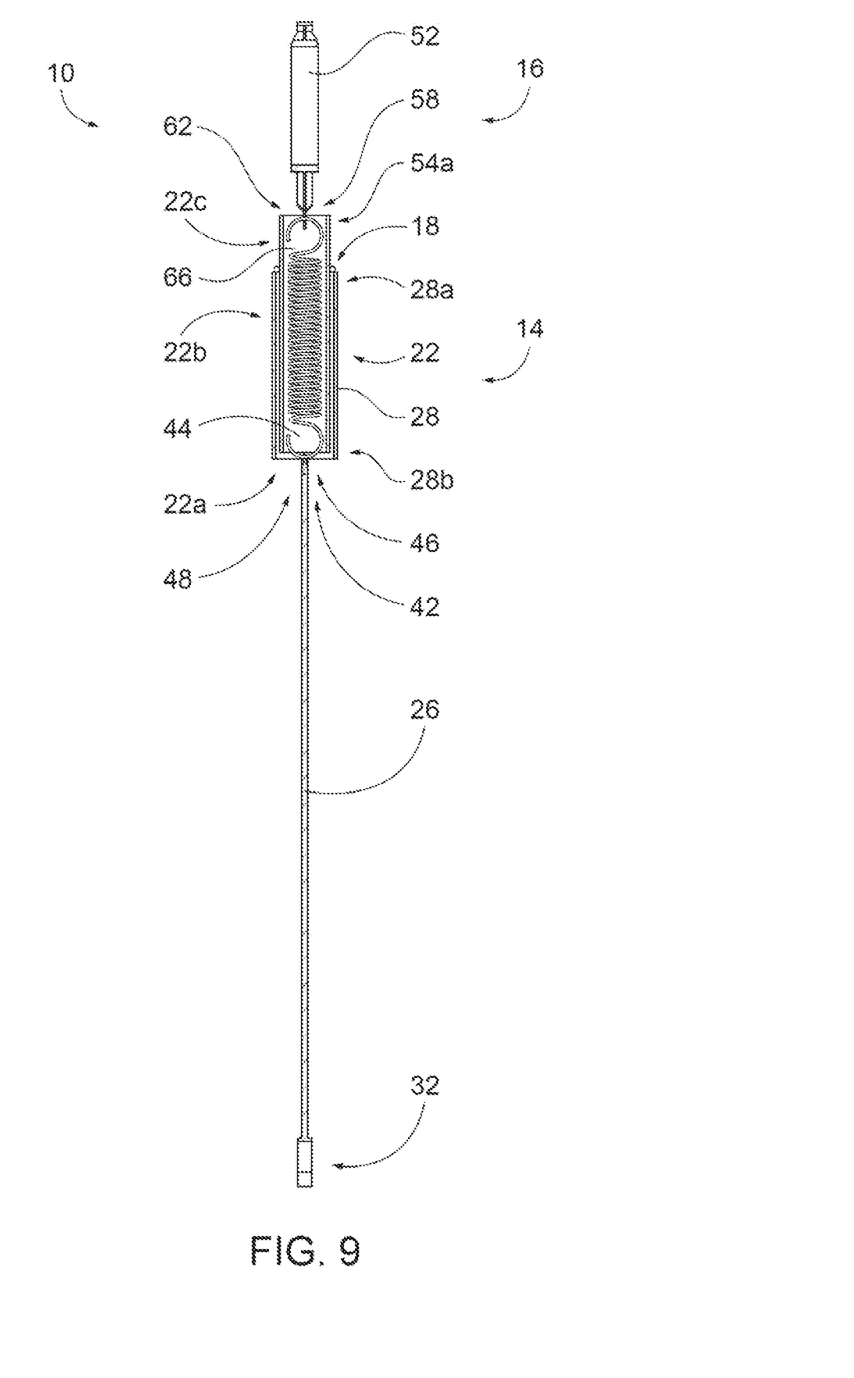
FIG. 9 is a partial sectional side elevation view of the hanging basket device of FIG. 3.

As shown in FIG. 3, the first housing 14 and the second housing 16 can cooperate to define an unwatered state when the associated hanging basket 12 that is attached to the first housing 14 has a first weight. Alternatively, as shown in FIG. 2, the first housing 14 and the second housing 16 can cooperate to define a watered state when the associated hanging basket 12 that is attached to the first housing 14 has a second weight. The first weight is less than the second weight.

Figure 1:
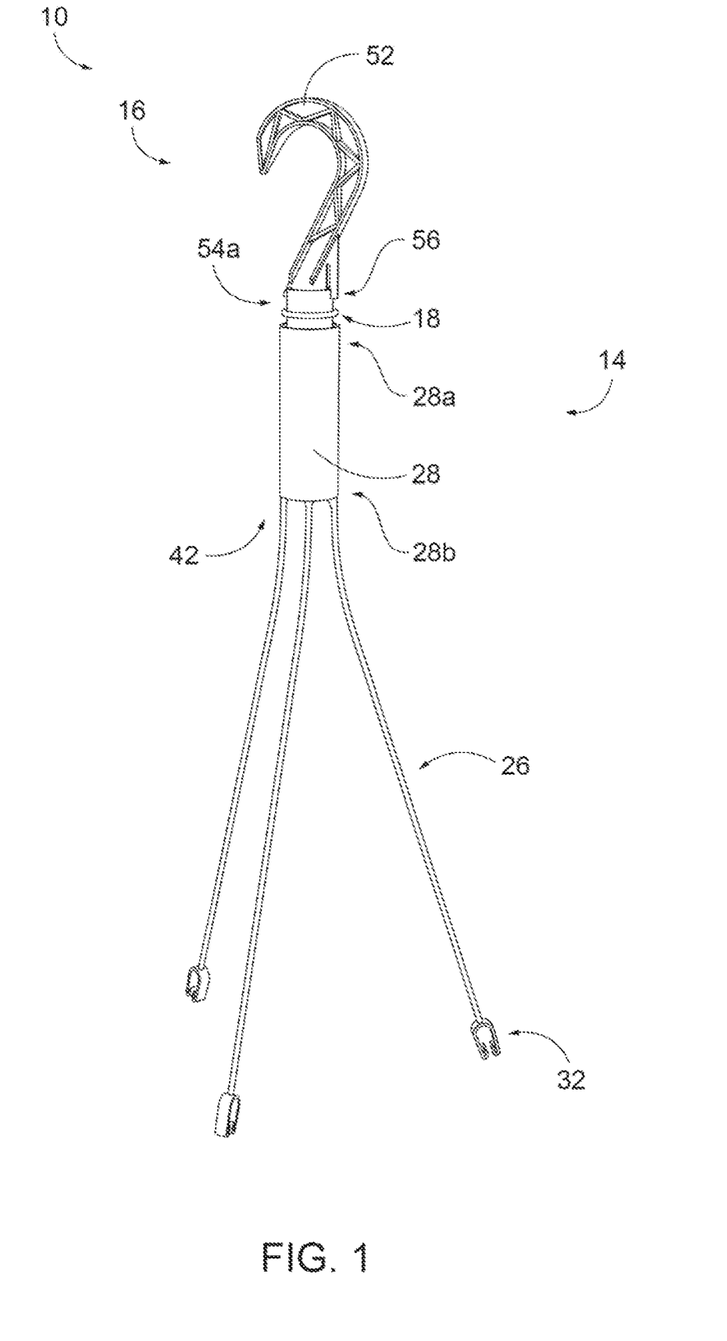
FIG. 1 is a perspective view of a hanging basket device according to the present disclosure in an empty state.

With reference to FIGS. 2 and 3, the user-adjustable indicia 18 is configured to directly contact the first housing 14 and the second housing 16 during the unwatered state and solely directly contact the second housing 16 during the watered state. As shown in FIG. 1, the first housing 14 and the second housing 16 can cooperate to define an empty state when the associated hanging basket 12 is not attached to the first housing 14 and the user-adjustable indicia 18 is configured to solely directly contact the second housing 16 during the empty state.

The user-adjustable indicia 18 defines an inner diameter that is adjustable to allow the user-adjustable indicia 18 to be movably retained on the second housing 16. This adjustability can be viewed by comparing FIG. 1 to either FIG. 2 or FIG. 3. Further, the shoulder 56 of the hook 52 is disposed on the outer diameter of the main body 54 so as to be greater than the inner diameter of the user-adjustable indicia 18.

Further still, the user-adjustable indicia 18 is movable on the second housing 16 along the sliding axis between the shoulder 56 of the hook 52 and an end of the first housing 14 (i.e., upper end 34) that is opposite the associated hanging basket 12. Thus, the user-adjustable indicia 18 can be movable along the second housing 16 adjacent the upper aperture 38 upward along the sliding axis in a direction away from the associated hanging basket 12.

As will be appreciated, the ability of the user-adjustable indicia 18 to be moved on the second housing 16 provides numerous advantages. For example, the user can set a custom location of the user adjustable indicia 18 on the second housing 16 so that the relative position of the first housing 14 with respect to the second housing 16 can be rapidly ascertained. Alternatively, if the user desires to utilize the hanging basket device 10 with a different hanging basket that has a different weight, the user-adjustable indicia 18 can be moved to match the requirements of the alternative hanging basket. Nor does the user have to memorize the original "tare" setting of the user-adjustable indicia 18.

A method of maintaining a hanging basket 12 includes providing a hanging basket device 10 that includes the first housing 14, the second housing 16 at least partially slidably received in the first housing 14, and user-adjustable indicia 18. The method can also include the steps of connecting the first housing 14 to the hanging basket 12 and adjusting the user-adjustable indicia 18 to a position on the second housing 16 to reflect a current position of the first housing 14 with respect to the second housing 16. Further, the user-adjustable indicia 18 can be slid on the second housing 16 during adjustment.

It will be appreciated that the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hanging basket device, comprising:
   a first housing configured to be connected to an associated hanging basket;
   a second housing at least partially slidably received in the first housing; and
   a user-adjustable indicia that is disposed on the second housing to indicate a relative positional relationship between the first housing and the second housing, wherein the first housing and the second housing cooperate to define a sliding axis along which the first housing slides with respect to the second housing, and wherein the user-adjustable indicia is movable on the second housing along the sliding axis.

2. The hanging basket device of claim 1, further comprising a spring that elastically joins the first housing and the second housing together, wherein the first housing and the second housing cooperate to define an unwatered state when the associated hanging basket that is attached to the first housing has a first weight and the first housing and the second housing cooperate to define a watered state when the associated hanging basket that is attached to the first housing has a second weight, wherein the first weight is less than the second weight, and wherein the user-adjustable indicia is configured to directly contact the first housing and the second housing during the unwatered state and solely directly contact the second housing during the watered state.

3. The hanging basket device of claim 2, wherein the first housing is configured to be selectively connected to the associated hanging basket, wherein the first housing and the second housing cooperate to define an empty state when the associated hanging basket is not attached to the first housing, and wherein the user-adjustable indicia is configured to solely directly contact the second housing during the empty state.

4. The hanging basket device of claim 1, wherein the second housing defines a second housing outer diameter and the user-adjustable indicia defines an indicia inner diameter, and wherein the indicia inner diameter is greater than the second housing outer diameter so as to allow the user-adjustable indicia to be moved on the second housing with respect to the first housing.

5. The hanging basket device of claim 4, wherein the first housing defines a first housing inner diameter and the user-adjustable indicia defines an indicia outer diameter, and wherein the indicia outer diameter is greater than the first housing inner diameter.

6. The hanging basket device of claim 1, wherein the first housing defines an upper aperture that is an entry point for the second housing into the first housing, the user-adjustable indicia being movable along the second housing adjacent the upper aperture of the first housing upward along the sliding axis in a direction away from the associated hanging basket.

7. The hanging basket device of claim 1, wherein the user-adjustable indicia defines an inner diameter that is adjustable to allow the user-adjustable indicia to be movably retained on the second housing.

8. The hanging basket device of claim 1, wherein the second housing includes a main body and a hook disposed at opposite ends thereof, the main body including a proximal end that is completely received in the first housing and a distal end attached to the hook, wherein the hook includes a shoulder disposed on an outer diameter of the main body of the second housing.

9. The hanging basket device of claim 8, wherein the user-adjustable indicia defines an inner diameter, and wherein the shoulder of the hook is disposed on the outer diameter of the main body so as to be greater than the inner diameter of the user-adjustable indicia.

10. The hanging basket device of claim 9, wherein the first housing and the second housing cooperate to define a sliding axis along which the first housing slides with respect to the second housing, and wherein the user-adjustable indicia is movable on the second housing along the sliding axis between the shoulder of the hook and an end of the first housing that is opposite the associated hanging basket.

11. The hanging basket device of claim 1, further including a spring that elastically connects the first housing and the second housing together so as to define a sliding axis, wherein the first housing includes a stop member disposed within a first chamber that limits movement of the second housing beyond a predetermined point, and wherein the stop member extends between opposing surfaces of the second housing so as to pass through the sliding axis.

12. The hanging basket device of claim 11, wherein the spring includes a first loop connected to the first housing that defines a first terminus of the spring and a second loop connected to the second housing that defines a second terminus of the spring, the spring also including a plurality of coils disposed between the first loop and the second loop, wherein the stop member defines a first bore that receives the first loop of the spring.

13. The hanging basket device of claim 12, wherein the second housing includes a hook for hanging the hanging basket device, the hook defining a second bore that receives the second loop of the spring.

14. The hanging basket device of claim 13, the first housing defining a first chamber and the second housing defining a second chamber, wherein the first bore and the second bore confine the spring such that the spring is completely received within the first chamber and the second chamber.

15. A hanging basket device, comprising:
   a first housing configured to be connected to an associated hanging basket;
   a second housing at least partially slidably received in the first housing;
   a user-adjustable indicia that is disposed on the second housing to indicate a relative positional relationship between the first housing and the second housing; and
   a spring that elastically connects the first housing and the second housing together so as to define a sliding axis, the second housing including a hook and a main body, the main body including a proximal end adjacent the hook and a distal end that is received in the first housing, the first housing including a plurality of arms configured for attachment to the associated hanging basket and a primary element, the primary element including an upper end that defines an entry point for the second housing into the first housing and a lower end that is adjacent the plurality of arms.

16. The hanging basket device of claim 15, wherein the distal end of the main body of the second housing defines a distal aperture that receives the hook and the proximal end defines a proximal aperture, the second housing defining a second chamber that extends from the distal aperture to the proximal aperture along the sliding axis, and wherein the distal aperture provides unimpeded entry into and exit from the second chamber but for the hook.

17. The hanging basket device of claim 15, wherein the lower end of the primary element of the first housing defines a lower aperture that receives the plurality of arms and the upper end defines an upper aperture, the first housing defining a first chamber that extends from the lower aperture to the upper aperture along the sliding axis, wherein the first housing includes a stop member disposed within the first chamber that limits movement of the second housing beyond a predetermined point, and wherein the lower aperture provides unimpeded entry into and exit from the first chamber but for the plurality of arms and the stop member.

18. The hanging basket device of claim 15, wherein the second housing defines a second housing outer diameter and the user-adjustable indicia defines an indicia inner diameter, and wherein the indicia inner diameter is greater than the second housing outer diameter so as to allow the user-adjustable indicia to be moved on the second housing with respect to the first housing.

19. The hanging basket device of claim 15, wherein the user-adjustable indicia defines an inner diameter that is adjustable to allow the user-adjustable indicia to be movably retained on the second housing.

20. A method of maintaining a hanging basket, comprising:
  providing a hanging basket device that includes a first housing, a second housing at least partially slidably received in the first housing, and user-adjustable indicia;
  connecting the first housing to the hanging basket; and
  adjusting the user-adjustable indicia to a position on the second housing to reflect a current position of the first housing with respect to the second housing, wherein the user-adjustable indicia is slid on the second housing during adjustment.

* * * * *